UNITED STATES PATENT OFFICE.

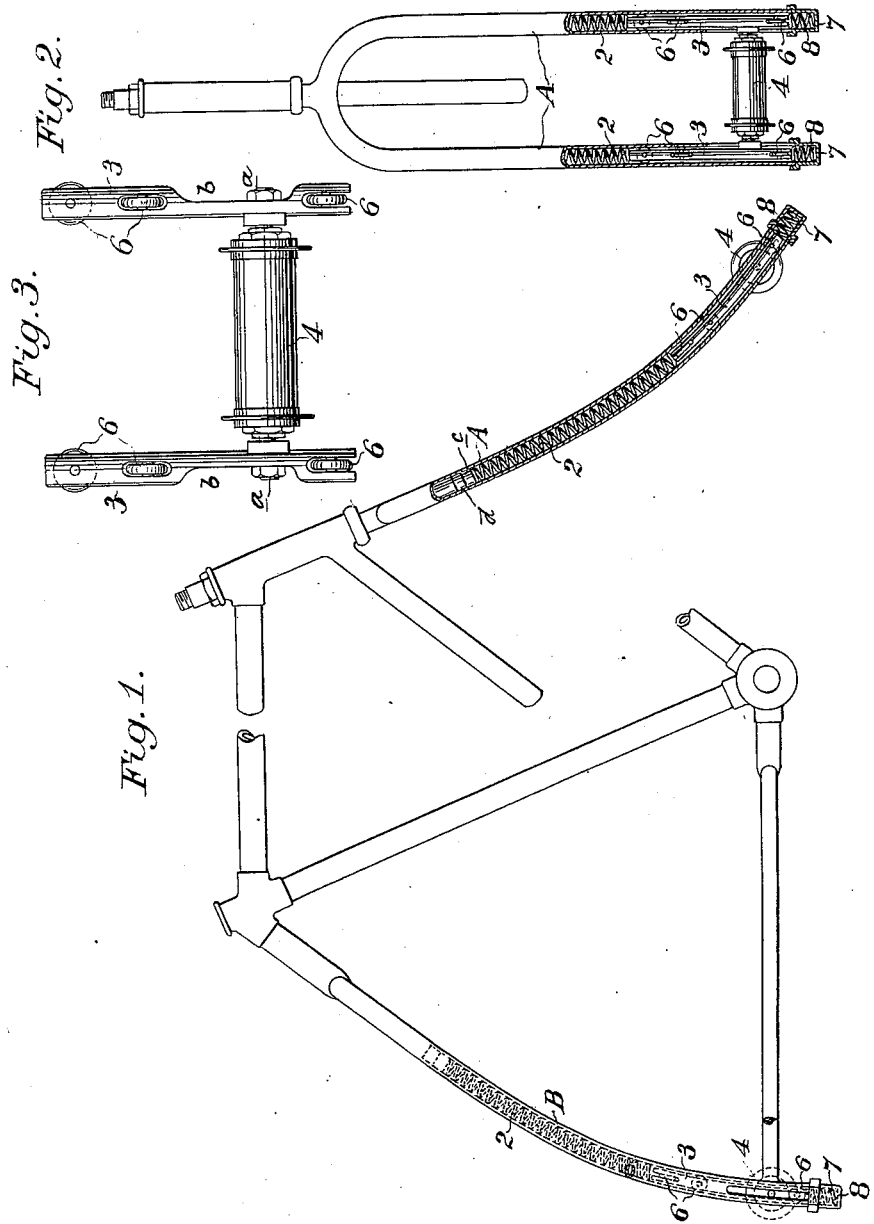

OLIN J. LAWRY, OF REDDING, CALIFORNIA.

BICYCLE.

SPECIFICATION forming part of Letters Patent No. 664,052, dated December 18, 1900.

Application filed March 22, 1900. Serial No. 9,693. (No model.)

*To all whom it may concern:*

Be it known that I, OLIN J. LAWRY, a citizen of the United States, residing at Redding, county of Shasta, State of California, have invented an Improvement in Bicycles; and I hereby declare the following to be a full, clear, and exact description of the same.

My invention relates to improvements in bicycles, and is designed to provide a relief for the rider against the shocks caused by traveling over rough and uneven ground.

It consists of the construction and combination of parts hereinafter described and claimed.

In the accompanying drawings, Figure 1 is a side view of the front and rear forks of a bicycle. Fig. 2 is a front view of the forward fork. Fig. 3 is a view of the forward sliding axle.

A represents the front and B the rear fork of a bicycle. 2 2 are springs. In the present case I have shown these springs as being spiral, and the fork of the machine is suitably shaped so that the springs may be fitted either interior or exterior to the fork. These springs are of sufficient length and the upper ends abut against any stop, such as shown at $d$, while the lower ends abut against the slidable guides 3. These guides are fitted to receive the ends of the wheel-axles 4, which are secured to them by nuts or otherwise, so as to be rigid. As the ends of the axle extend through the slides and are secured thereto by nuts $a$, as shown in Fig. 3, I recess the slides at $b$, so that the securing-nuts $a$ will lie inside of the plane of the outer sides of the slides, whereby said nuts will not contact with the inner walls of the hollow forks, and thereby retard the free movements of the slides. The slides are of sufficient length to be properly guided upon the forks and to prevent the wheels from wabbling or rocking from side to side, the object being to provide for a smooth and even movement of the slides whenever the springs are compressed to extend it.

The springs upon each of the forks are made as nearly equal in compressive and tensile strength as is possible, and any slight variations may be corrected by adjusting the stops against which the ends of the springs contact until the tension of both springs is practically the same. Such stops may be made movable and adjustable with relation to the forks, or they may consist of disks or pieces $c$, introduced so that the ends of the springs abut against them.

It will be understood that the springs may, as before stated, be applied outside or inside of the tubular forks. For appearance and cleanliness it is preferable to fit them interior to the fork side.

In order to relieve the slides as much as possible of friction attending their movements, I have shown the upper and lower ends as provided with antifrictional devices 6. These devices may be in the form of balls suitably fitted in ball-cases, so that their peripheries will move easily against the surfaces of the forks, or, if preferred, rollers may be journaled at right angles with each other, so that their peripheries will travel in contact with the forks. If the guides were slidable upon the exterior of the forks, then the arrangement of the balls or other antifrictional devices would be made to suit the position. These guides are of sufficient length and of a curvature corresponding with that of the fork sides, and as the wheel-axles are firmly locked to them the structure is so rigid that it prevents any side movements of the wheels, while the springs yield to any pressure.

The lower ends of the fork sides containing the springs are fitted with removable caps 7, in which are springs 8, and these springs contact with the lower ends of the slides except where the weight of the machine compresses the springs 2.

The whole device is intended to provide a very easy and comfortable riding machine in which the shocks of rough roads will be reduced and very little of them transmitted to the rider.

By the use of these springs I am enabled to use solid or cushion tires for the wheels and dispense with pneumatic tires, with their liability to puncture and other accidents.

Having thus described my invention, what I claim as new, and desire to secure by Letters Patent, is—

The combination with the forks of a bicycle, having slotted inner sides, and wheels adapted to revolve between said forks, of a guide interior to each member of said forks and extending some distance above and below their point of connection with the wheel-axle, each of said guides having its upper and lower ends slotted one at right angles to the other and having their intermediate portions recessed and rollers mounted in said slotted ends and also in slots in the guides at points intermediate of said ends, said rollers contacting with the inner walls of the forks, said axle having its ends passed through the guides and into the recessed portion thereof, and nuts located in said recessed portions whereby the ends of the axle are rigidly secured to the guides, and springs located within the forks above and below the guides, and yielding to pressure thereon.

In witness whereof I have hereunto set my hand.

OLIN J. LAWRY.

Witnesses:
S. H. NOURSE,
JESSIE C. BRODIE.